United States Patent [19]

Yamada et al.

[11] Patent Number: 5,585,084
[45] Date of Patent: Dec. 17, 1996

[54] SILICON NITRIDE POWDER

[75] Inventors: Tetsuo Yamada; Takeshi Yamao, both of Yamaguchi-ken; Keiichiro Watanabe; Youky Bessyo, both of Aichi-ken, all of Japan

[73] Assignees: Ube Industries, Ltd., Yamaguchi-ken, Japan; NGK Insulators, Ltd., Aichi-ken, Japan

[21] Appl. No.: 455,999

[22] Filed: May 31, 1995

[30] Foreign Application Priority Data

Jun. 20, 1994 [JP] Japan ................................. 6-136756

[51] Int. Cl.$^6$ .................................................. C04B 35/584
[52] U.S. Cl. ............................ 423/344; 423/409; 501/97
[58] Field of Search ............................. 501/97; 423/344, 423/409

[56] References Cited

U.S. PATENT DOCUMENTS

| | | | |
|---|---|---|---|
| 4,929,432 | 5/1990 | Shen | 423/344 |
| 5,248,490 | 9/1993 | Krause | 501/97 |
| 5,394,015 | 2/1995 | Tsuzuki et al. | 501/97 |
| 5,453,407 | 9/1995 | Chung et al. | 501/97 |
| 5,456,896 | 10/1995 | Fukuoka et al. | 423/344 |

OTHER PUBLICATIONS

T. Yamada et al., *Yogyo–Kyokai–Shi*, vol. 93, No. 7, 1985, pp. 394–397 no month.

K. Watanabe et al., "Measurement of Surface Oxygen Content in Silicon Nitride Powders", *Journal of the Ceramic Society of Japan*, vol. 101, No. 12, 1993, pp. 1419–1422 no month.

F. Izumi et al., "Rietveld refinements for calcium and yttrium containing α–sialons" *Journal of Materials Science*, vol. 19, 1984, pp. 3115–3120 no month.

*Primary Examiner*—Karl Group
*Attorney, Agent, or Firm*—Young & Thompson

[57] ABSTRACT

A silicon nitride powder containing β-phase and α-phase at a ratio by weight (β/α) of from 0.018 to 0.032, and composed of crystallites 0.2 μm or less in diameter.

7 Claims, No Drawings

SILICON NITRIDE POWDER

BACKGROUND OF THE INVENTION

1. Field of the Invention

The present invention relates to a readily sinterable silicon nitride powder for use as a starting material for sintered silicon nitride ceramics useful as structural ceramics, and particularly, for silicon nitride ceramics having excellent strength at high temperatures.

2. Description of Related Art

Recently, because of their superior characteristics concerning strength, toughness, and corrosion resistance, more silicon nitride ceramics are used in various fields as structural materials or machine parts at a temperature not higher than 1,000° C. Generally, an addition of from about 5 to 10% by weight of an oxide such as $Y_2O_3$ and $Al_2O_3$ is indispensable in sintering silicon nitride. However, these additives have lead to the problematic formation of a grain boundary phase which readily undergoes softening at a high temperature. To prevent the drop in strength at high temperatures due to the formation of a grain boundary phase, etc., and to obtain a sintered silicon nitride ceramics capable of maintaining high strength in a temperature range of from room temperature to 1,500° C., not only a sintering aid such as $Yb_2O_3$ is proposed, but also a powder having favorable properties for use as a starting material of a sintering is developed.

Silicon nitride powder has been prepared heretofore by means of, for example, (1) direct nitridation of metallic silicon powder; (2) carbothermal reduction and nitridation of silica powder; and (3) imide decomposition process which comprises reacting a silicon halide with ammonia. The silicon nitride powders thus prepared by different methods enumerated above yield approximately the same impurity concentration, oxygen concentration, particle diameter, etc., however, their sinterability and the properties of sintered bodies that result therefrom greatly differ from each other depending, assumably, on the processing history. In general, the silicon nitride powder prepared by the imide decomposition process (3) described hereinbefore is believed to be the most easily sinterable one, and to yield sintered bodies having superior characteristics.

With progress in the research on the relation between the powder characteristics and the sinterability as well as the properties of the sintered bodies resulting from the powder, and with the factors dominating the sinterability of a powder and the properties of the sintered bodies resulting therefrom becoming better understood, it has been found that the production history is not the absolute factor which poses influence on the sinterability of a powder and the properties of the sintered bodies resulting therefrom, and that various powder characteristics mutually react with each other to have influence on the sinterability, etc., of a powder. This is described in further detail below.

Silicon nitride is available in two different crystalline phases; i.e., α-and β-phase. The β-phase is an oxygen-free pure crystalline silicon nitride, but the α-phase takes up oxygen into the crystal lattice thereof to form a solid solution with oxygen. During the heating step in sintering silicon nitride, silica on the surface of the silicon nitride particles reacts with the sintering aid as to generate a liquid phase. Hence, during the sintering process, silicon nitride dissolve into the liquid phase and reprecipitates in the form of a β-phase as to provide a dense sintered body. Accordingly, it is believed that a silicon nitride powder containing 85% or more of an α-phase is preferred for use as a starting material for producing a sintered body.

However, no convincing conclusion is derived to the present on the correlation between the phase composition (β-phase fraction, α-phase fraction, and amorphous phase fraction) of a silicon nitride powder containing α-phase at a concentration of 85% or higher and the sinterability or the properties of the sintered bodies which results from the powder. Furthermore, the mutual influence that is cast to each other between the phase composition and the other powder characteristics is yet to be clarified. Thus, it has been found very difficult to stably produce a sintered silicon nitride ceramics having high strength at high temperature, and still, at a high reproducibility.

SUMMARY OF THE INVENTION

An object of the present invention is to provide a silicon nitride powder which enables stable and reproducible production of a sintered silicon nitride ceramics having high strength at high temperatures.

The present inventors have extensively studied the relation between the powder characteristics of silicon nitride and the sinterability or the properties of the sintered bodies which results therefrom. As a result, it has been found that the aforementioned object of the present invention can be achieved by a silicon nitride powder containing β- and α-phase at a predetermined range of concentration ratio by weight and whose crystallite size fall in a predetermined range.

The present invention has been accomplished based on the findings above. More specifically, the present invention provides a silicon nitride powder characterized in that it contains β- and α-phase at a concentration ratio by weight (β/α) of from 0.018 to 0.032, and that it is composed of crystallites 0.2 m or less in diameter.

The silicon nitride powder according to the present invention enables stably and with high reproducibility, a sintered silicon nitride ceramics which exhibits high strength at high temperatures.

DETAILED DESCRIPTION OF THE INVENTION

The silicon nitride powder according to the present invention is characterized in that it contains β- and α-phase at a concentration ratio by weight (referred to simply hereinafter as "a β/α ratio") of from 0.018 to 0.032, and preferably, from 0.020 to 0.030.

The silicon nitride powder according to the present invention is characterized in that it contains β- and α-phase particles having a crystallite size in a range of 0.2 μm or less, and preferably, in a range of from 0.01 to 0.1 μm.

If the β/α ratio should exceed a value of 0.032, the crystal growth of columnar crystals which occurs accompanying the α- to β-phase transition during the sintering process is found to be suppressed as to reduce the high temperature strength of the sintering. If the β/α ratio should be lower than 0.018, the α- to β-phase transition in the sintering process shifts to the high temperature side as to cause abnormal growth of β-phase particles upon precipitation. In such a case, columnar crystals having a high aspect ratio generate heterogeneously as to hinder the densification of the sintered body as a whole. It can be seen from the foregoing discussion that the β-phase particles function as nuclei which accelerate the α- to β-phase transition during the sintering, and that they enhance the transition to occur swiftly at lower temperatures. If the crystal diameter of the β-phase particles should exceed a value of 0.2 μm, however, the β-phase particles can no longer function as crystal growth nuclei. Accordingly, the effect of the present invention can no longer be expected even if the β/α ratio should fall in a predetermined range above.

The silicon nitride powder according to the present invention contains amorphous phase at a weight fraction of 5% or lower. To achieve the initial object of the invention, more preferred is that the amorphous phase account for 4% by weight or lower, and that carbon account for 0.12% by weight or lower, particularly, 0.10% by weight or lower.

If the amorphous component should be present at a concentration of more than 5% by weight, the fine amorphous component disperses heterogeneously inside the molding which leads to the inhomogeneous packing of particles, and it sometimes remains even after the sintered body in the form of residual pores and microcracks to impair the strength of the sintered body. Carbon also reacts with the auxiliary components (oxides) that are added at the sintering as to generate CO gas. Because CO gas sometimes causes residual pores, the concentration of carbon is preferably 0.12% by weight or lower.

The β/α ratio for the silicon nitride powder according to the present invention is obtained by Rietvelt analysis (for reference, see F. Izumi, M. Mitomo, and Y. Bando, *Journal of Material Science*, Vol. 19 (1984) pp. 3115–3120) of an X-ray diffraction pattern obtained by step scanning over a diffraction angle range (2 θ) of from 10° to 70° at a step of 0.05°. Conventional technique of X-ray powder diffraction fails to precisely measure trace components that are present at a concentration of 5% by weight or lower. Accordingly, it had been found impossible to produce silicon nitride powder having an β/α ratio in a range of from 0.018 to 0.032 with high reproducibility. The use of Rietvelt analysis enables measuring of the crystalline phase that is present at a trace quantity with high precision.

The crystallite diameter of the silicon nitride powder according to the present invention is obtained according to the Scherrer's equation as follows:

$$D_{hkl} = \frac{K \cdot \lambda}{\beta \cos\theta}$$

where, $D_{hkl}$ represents the crystallite diameter (Å); $\lambda$ represents the wavelength of the measuring X-ray (Å); $\beta$ represents the broadening of the diffraction line (radian); $\theta$ represents the Bragg angle of the diffraction line; and K represents a constant (0.9 when $\beta$ represents the full angular width at half-maximum intensity (FWHM)). This time again, the full angular width at half maximum intensity (FWHM) is calculated with high precision employing Rietvelt analysis on the powder X-ray diffraction pattern in the same manner as in the case of obtaining the β/α ratio above.

In calculating FWHM, the line profile must be corrected for the inherent line broadening attributed to the geometry of the diffractometer. Accordingly, correction is made by employing a standard silicon powder distributed by NIST (National Institute of Standards and Technology) of the U.S.A.

The fraction of amorphous component in the silicon nitride powder according to the present invention is obtained according to the hydrolysis method described in *Journal of the Ceramic Society of Japan*, Vol. 93, No. 7 (1985), pp. 394–397.

The silicon nitride powder according to the present invention generally yields a specific surface area in a range of from 6.0 to 25.0 m²/g and contains from 0.8 to 2.0% by weight of oxygen (from 0.4 to 1.5% by weight of internal oxygen and from 0.25 to 0.8% by weight of surface oxygen), and 0.1% by weight or less of metal impurities.

The oxygen concentration in the silicon nitride powder is measured in the following manner.

The total oxygen content is measured by means of LECO method.

The surface oxygen content is measured by means of chemical analysis described in *Journal of the Ceramic Society of Japan*, Vol. 101, No. 12 (1993), p. 1420. More specifically, the surface oxide layer is assumed to consist of $SiO_2$ and $Si_2N_2O$. Considering that $SiO_2$ and $Si_2N_2O$ dissolve in hydrofluoric acid but that $Si_3N_4$ does not, the surface oxide layer alone is eluted. The elution is effected for a duration of 60 minutes at room temperature. After obtaining $NH_3$ from the eluate by distillation, the concentration of nitrogen $C_N^s$ (% by weight) and that of silicon $C_{Si}^s$ (% by weight) are measured by means of absorptiometry using Indophenol Blue and molybdenum blue, respectively. The surface oxygen content $Co^s_{CA}$ (% by weight) by chemical analysis is calculated from the thus observed $C_N^s$ and $C_{Si}^s$ according to the following equation:

$$Co^s_{CA} = 1.1393 C_{Si}^s - 1.7134 C_N^s.$$

About 1 g of the sample is used for a single run of analysis, and the average of two times of measurement is employed as the observed value. A hydrofluoric acid solution obtained by diluting a reagent grade aqueous HF solution to ten times is used.

The internal oxygen content is calculated by subtracting the surface oxygen content above from the total oxygen content.

The process for producing a silicon nitride powder according to the present invention is described below.

The silicon nitride powder according to the present invention can be produced by various methods inclusive of direct nitridation of metallic silicon powder, carbothermal reduction and nitridation of silica powder, or imide decomposition, but particularly preferred among them is the imide decomposition method in which the powder characteristics such as the concentration ratio of the crystalline phases, internal oxygen content, secondary particle size, primary particle size, or specific surface area are optionally controlled. According to the imide decomposition process, the powder characteristics enumerated above can be controlled by, for instance, setting the calcining conditions (e.g., packing density, heating rate, maximum temperature of retention, retention time, etc.) on crystallizing silicon nitride by calcining amorphous silicon nitride obtained as a product of pyrolysing silicon diimide.

The silicon nitride powder according to the present invention can be produced by performing direct nitridation of metallic silicon powder. For example, from 5 to 20% by weight of a silicon nitride powder containing 92% or more of α-phase and having a specific surface area of 10 m²/g or more is added into and mixed with a metallic silicon powder having a specific surface area of 10 m²/g or more and containing 1.0% by weight or less of oxygen, and the resulting mixture is heated to a temperature in a range of from 1,400° to 1,500° C. at a heating rate of from 10° to 50° C./h under a mixed gas atmosphere containing gaseous hydrogen and gaseous nitrogen, or a mixed gas atmosphere containing gaseous ammonia and gaseous nitrogen. To control the crystalline phase of the powder product, the quantity of the metallic powder in the starting material and the packing density of the powder mixture must be carefully controlled. The powder product thus obtained is then subjected to a size reduction process and acid treatment to control the particle size distribution and to remove the impurities. Thus is obtained the desired powder.

Sintered silicon nitride ceramics can be produced from the silicon nitride according to the present invention in the same manner as that employed in the conventional processes. For instance, the silicon nitride powder is mixed with a sintering aid such as aluminum oxide, yttrium oxide, or magnesium oxide, and the resulting mixture is sintered after molding it into a desired shape. The molding process is effected under a pressure in a range of from about 0.5 to 10 ton/cm$^2$, and the sintering process is effected for a duration of from 1 to 10 hours at a temperature in a range of from 1,500° to 2,000° C. under an atmosphere pressurized at a range of from 0.5 to 100 atm.

The sintered silicon nitride ceramics thus obtained from the silicon nitride powder according to the present invention is distinguished in that it yields a high strength at high temperatures. Thus, the silicon nitride powder according to the present invention is particularly suitable for use as a starting material for producing sintered silicon nitride ceramics of structural materials of heat engines or machine parts operating at high temperatures, such as diesel engines or gas turbines.

The present invention is described in further detail below referring to a non-limiting example and a comparative example.

EXAMPLES 1 TO 11 AND

COMPARATIVE EXAMPLES 1 TO 5

Silicon nitride powder samples were prepared by imide decomposition method described below under the conditions given in Table 1. The powder characteristics of the powder samples thus obtained are given in Table 2.

Preparation of Silicon Nitride Powder Samples

After purging the inner air of a vertical reaction vessel (30 cm in diameter and 45 cm in height) cooled to a temperature of −20° C. with gaseous nitrogen, liquid ammonia and toluene were charged therein. In the reaction vessel, liquid ammonia and toluene each constituted separate layers; liquid ammonia yielded the upper layer, and toluene provided the lower layer. A toluene solution of silane halide prepared previously by mixing toluene and silicon tetrachloride at a former to the latter ratio by volume of 3 was supplied to the lower layer through a pipe while slowly stirring the lower toluene layer. With the supply of toluene solution, a white-colored reaction product was observed to precipitate in the vicinity of the interface between the upper and the lower layers.

Upon completion of the reaction, the reaction solution was sent to the filtration vessel, in which the product was filtered and cleaned four times in batches to obtain a purified silicon diimide.

The resulting silicon diimide was heated to 1,000° C. under a gaseous nitrogen atmosphere containing 0.2% of oxygen to effect decomposition. Thus was obtained a powder of amorphous silicon nitride. After subjecting the amorphous silicon nitride powder to milling using a vibration mill, the product was charged inside a graphite crucible and was tapped as to obtain the packing density given in Table 1. The amorphous silicon nitride powder packed at a desired density was heated and calcined in an electric furnace under the conditions given in Table 1 (heating rate, maximum temperature and the retention time at the maximum temperature, and CO concentration inside the furnace). A grayish white silicon nitride powder was obtained in this manner.

The CO concentration inside the furnace was adjusted by controlling the dew point and the flow rate of gaseous nitrogen flown inside the furnace. Upon observing the silicon nitride powder under a scanning electron microscope, cubic granular particles from 0.05 to 0.5 μm in size alone were observed. The silicon nitride powder thus obtained yielded a chlorine concentration of 50 ppm or lower.

TABLE 1

| | Powder Preparation Conditions | | | | |
| --- | --- | --- | --- | --- | --- |
| | Packing Density of | Heating Conditions | | | |
| | amorphous Silicon nitride powder (g/cm$^3$) | Heating rate (°C./h) | Maximum temp. (°C.) | Retention time (h) | CO concn.[1] (ppm) |
| Ex. 1 | 0.150 | 100 | 1550 | 2.0 | 550 |
| Ex. 2 | 0.125 | 200 | 1350 | 1.0 | 440 |
| Ex. 3 | 0.180 | 100 | 1500 | 1.0 | 430 |
| Ex. 4 | 0.146 | 200 | 1370 | 2.0 | 690 |
| Ex. 5 | 0.208 | 100 | 1550 | 1.0 | 600 |
| Ex. 6 | 0.242 | 50 | 1370 | 3.5 | 520 |
| Ex. 7 | 0.176 | 200 | 1350 | 4.0 | 640 |
| Ex. 8 | 0.118 | 200 | 1330 | 3.0 | 370 |
| Ex. 9 | 0.176 | 200 | 1330 | 4.0 | 480 |
| Ex. 10 | 0.150 | 100 | 1520 | 4.0 | 930 |
| Ex. 11 | 0.208 | 100 | 1480 | 4.0 | 1100 |
| Comp. Ex. 1 | 0.158 | 50 | 1430 | 2.0 | 480 |
| Comp. Ex. 2 | 0.092 | 200 | 1370 | 4.0 | 390 |
| Comp. Ex. 3 | 0.184 | 50 | 1660 | 4.0 | 570 |
| Comp. Ex. 4 | 0.214 | 50 | 1700 | 2.0 | 680 |
| Comp. Ex. 5 | 0.238 | 100 | 1590 | 1.0 | 660 |

[1]: CO concentration inside the furnace

TABLE 2

| | Powder Characteristics | | | | | | |
|---|---|---|---|---|---|---|---|
| | β/α ratio by wt. | Concn. of a-phase[1] (wt. %) | Concn. of α-phase (wt. %) | Concn. of β-phase (wt. %) | Crystallite size α (nm) | Crystallite size β (nm) | Carbon concn. (wt. %) |
| Ex. 1 | 0.020 | <0.1 | 98.0 | 2.0 | 74 | 90 | 0.07 |
| Ex. 2 | 0.021 | 0.3 | 95.0 | 2.0 | 54 | 25 | 0.05 |
| Ex. 3 | 0.025 | <0.1 | 97.6 | 2.4 | 35 | 65 | 0.04 |
| Ex. 4 | 0.025 | 1.0 | 96.6 | 2.4 | 64 | 45 | 0.10 |
| Ex. 5 | 0.029 | <0.1 | 97.2 | 2.8 | 60 | 75 | 0.08 |
| Ex. 6 | 0.029 | 0.5 | 96.7 | 2.8 | 48 | 55 | 0.06 |
| Ex. 7 | 0.029 | 2.0 | 95.2 | 2.8 | 68 | 35 | 0.09 |
| Ex. 8 | 0.022 | 6.2 | 91.8 | 2.0 | 28 | 35 | 0.03 |
| Ex. 9 | 0.031 | 5.8 | 91.4 | 2.8 | 40 | 50 | 0.06 |
| Ex. 10 | 0.020 | <0.1 | 98.0 | 2.0 | 92 | 85 | 0.13 |
| Ex. 11 | 0.029 | <0.1 | 97.2 | 2.8 | 105 | 70 | 0.15 |
| Comp. Ex. 1 | 0.016 | <0.1 | 98.4 | 1.6 | 75 | 60 | 0.05 |
| Comp. Ex. 2 | 0.016 | 0.4 | 98.0 | 1.6 | 82 | 40 | 0.03 |
| Comp. Ex. 3 | 0.020 | <0.1 | 98.0 | 2.0 | 78 | 210 | 0.07 |
| Comp. Ex. 4 | 0.025 | <0.1 | 97.6 | 2.4 | 70 | 230 | 0.09 |
| Comp. Ex. 5 | 0.033 | <0.1 | 96.8 | 3.2 | 88 | 100 | 0.09 |

[1]: Concentration of amorphous phase

TESTS

Sintered Silicon nitride ceramics were produced from each of the silicon nitride powder samples obtained in the forgoing Examples 1 to 11 and Comparative Examples 1 to 5. The final density and the bending strength of the sintered bodies thus obtained are summarized in Table 3. The bending test was performed according to a standard method JIS R 1601.

Production of Sintered Bodies

After adding 3% by weight of yttrium oxide and 7% by weight of aluminum oxide to each of the silicon nitride powder samples thus obtained, 50% by weight of water was added to the total mixture. The resulting mixture was dispersed and mixed for a duration of 24 hours in a pot mill. The slurry thus obtained was granulated by means of spray drying method to provide a powder for molding.

The resulting powder was subjected to cold isostatic pressing (CIPing) under a pressure of 1 ton/cm$^2$. The molding thus obtained was sintered at 1,900° C. for a duration of 3 hours in gaseous N$_2$ atmosphere pressurized to 9 kg/cm$^2$.

TABLE 3

| | Properties of the Sintered Bodies | | |
|---|---|---|---|
| | | Four-point bending strength | |
| | Final density (%) | Room temperature (MPa) | High temp. (1,300° C.) (MPa) |
| Ex. 1 | 96 | 1006 | 721 |
| Ex. 2 | 98 | 1095 | 710 |
| Ex. 3 | 99 | 1005 | 703 |
| Ex. 4 | 98 | 1023 | 723 |
| Ex. 5 | 98 | 1104 | 734 |
| Ex. 6 | 97 | 1090 | 729 |
| Ex. 7 | 97 | 1010 | 772 |
| Ex. 8 | 96 | 930 | 623 |
| Ex. 9 | 97 | 830 | 601 |
| Ex. 10 | 96 | 900 | 621 |
| Ex. 11 | 96 | 850 | 611 |
| Comp. Ex. 1 | 89 | 421 | 321 |
| Comp. Ex. 2 | 92 | 411 | 352 |
| Comp. Ex. 3 | 90 | 359 | 320 |
| Comp. Ex. 4 | 94 | 333 | 234 |
| Comp. Ex. 5 | 92 | 235 | 202 |

While the invention has been described in detail and with reference to specific embodiments thereof, it will be apparent to one skilled in the art that various changes and modifications can be made therein without departing from the spirit and scope thereof.

What is claimed is:

1. A silicon nitride powder containing β-phase and α-phase at a ratio by weight (β/α) of from 0.018 to 0.032, and composed of crystallites 0.2 μm or less in diameter.

2. A silicon nitride powder as claimed in claim 1, wherein the powder contains β-phase and α-phase at a ratio by weight (β/α) of from 0.020 to 0.030.

3. A silicon nitride powder as claimed in claim 1, wherein the powder is composed of crystallites from 0.01 to 0.1 μm in diameter.

4. A silicon nitride powder containing β-phase and α-phase at a ratio by weight (β/α) of from 0.018 to 0.032, composed of crystallites 0.2 μm or less in diameter, and containing 5% by weight or less of an amorphous phase.

5. A silicon nitride powder containing β-phase and α-phase at a ratio by weight (β/α) of from 0.018 to 0.032, composed of crystallites 0.2 μm or less in diameter, and containing 0.12% by weight or less of carbon.

6. A silicon nitride powder containing β-phase and α-phase at a ratio by weight (β/α) of from 0.018 to 0.032, composed of crystallites 0.2 μm or less in diameter, containing 5% by weight or less of an amorphous phase, and containing 0.12% by weight or less of carbon.

7. A silicon nitride powder for use in producing sintered ceramics, the powder containing β-phase and α-phase at a ratio by weight (β/α) of from 0.018 to 0.032 and composed of crystallites 0.2 μm or less in diameter.

* * * * *